Oct. 27, 1931.    W. SCHMIDT    1,829,457
ELECTRIC SOLDERING MEANS
Filed May 27, 1929
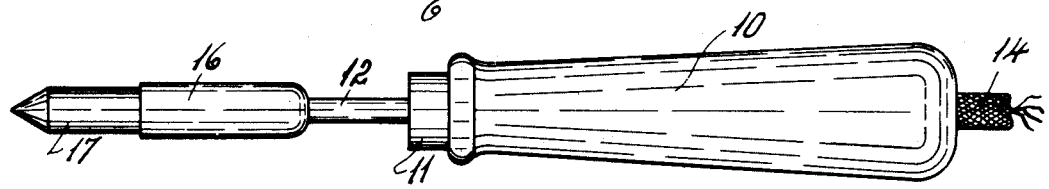
 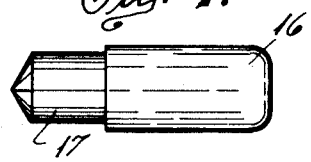
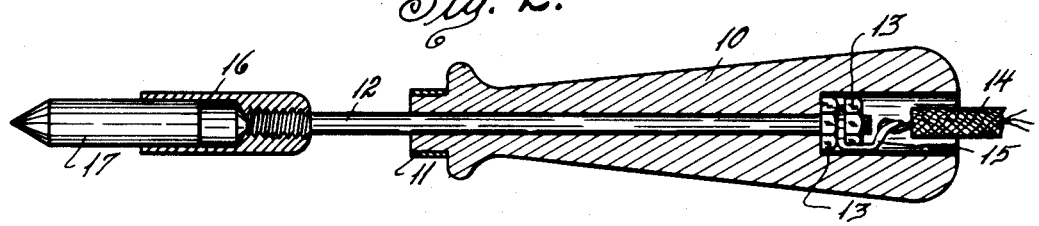
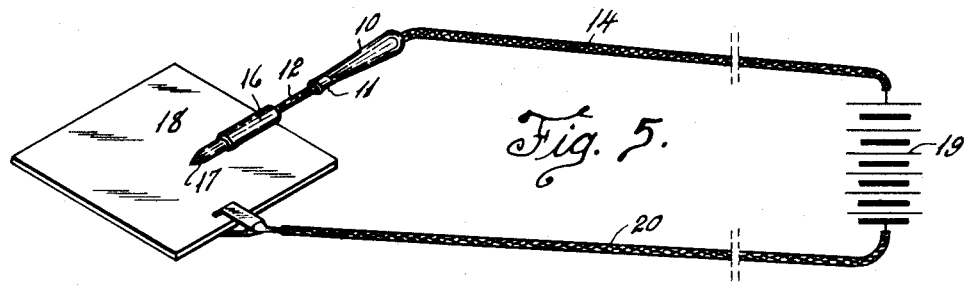
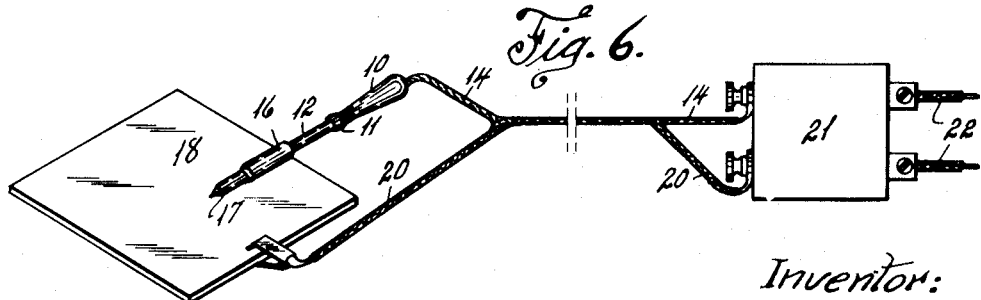
Inventor:
Walter Schmidt.
By Homer L. Sweet.
Attorney.

Patented Oct. 27, 1931

1,829,457

UNITED STATES PATENT OFFICE

WALTER SCHMIDT, OF DENVER, COLORADO, ASSIGNOR, BY MESNE ASSIGNMENTS, TO EUGENE T. AUGER, OF DENVER, COLORADO

ELECTRIC SOLDERING MEANS

Application filed May 27, 1929. Serial No. 366,160.

An object of this invention is to provide improved electric soldering means.

A further object of the invention is to provide improved electric soldering means of a type wherein the material to be soldered forms part of the electric circuit.

A further object of the invention is to provide improved electric soldering means of a type wherein a manually-operable tool is connected in one side of an electric circuit and the material to be soldered is connected in the other side of said circuit, said circuit being completed through contact of said tool with said material.

A further object of the invention is to provide improved electric soldering means including a manually-operable tool having a solder melting and spreading tip adapted to be heated by the passage of electric current therethrough.

A further object of the invention is to provide improved electric soldering means adapted for low voltage operation.

A further object of the invention is to provide improved electric soldering means including a solder melting and spreading tip heatable by the passage of electric current therethrough and of a material to which soldier does not adhere.

A further object of the invention is to provide improved electric soldering means including a manually-operable, electrically-heatable, removable and replaceable working tip of a material to which solder does not adhere.

A further object of the invention is to provide an improved construction of manually-operable tool in electric soldering means of the character described.

This invention relates to soldering means of that type wherein a low-voltage electric circuit is established through a manually-operable tool having an electrically-heatable working tip and through the material to be soldered in such manner that contact of said tip with said material completes the circuit and heats said tip, said tip being of a material to which solder does not adhere, thus obviating the necessity of cleaning and tinning said tip and providing a tool particularly adapted for soldering in confined and restricted spaces on automobiles and electrical equipment of all kinds, a particular feature of the invention being the specific construction of the tool and the ease with which its working tip may be removed and replaced to permit the use of tips of various sizes and shapes.

My invention consists in the construction, arrangement and combination of elements hereinafter set forth, pointed out in my claims and illustrated by the accompanying drawings in which—

Figure 1 is a side elevation of the improved manually-operable tool employed in the invention. Figure 2 is an axial, longitudinal section of the improved tool shown in Figure 1. Figures 3 and 4 are side elevations of tips adapted to be employed with the improved tool. Figure 5 is a semi-diagrammatic view of the improved tool operatively connected with an electric battery and in position for practical use. Figure 6 is a view similar to Figure 5 showing the means employed for operatively connecting the tool with a power line or other high-voltage source of electric current.

In the construction of the improvement, as shown, a handle 10 is formed of material having a low coefficient of thermal and electrical conductivity, such as wood, fiber and the like, said handle preferably being externally contoured to facilitate gripping thereof by the human hand and being formed with an axial, two-diameter bore, the larger portion of said bore being of less length than the smaller portion of the bore and opening through the larger or butt end of said handle, the smaller or tip end of said handle preferably being provided with a metallic annulus or ferrule 11 to prevent splitting thereof. A straight, metallic rod or stem 12, of a material having a relatively high coefficient of electrical conductivity, is formed with external threads on each end and is mounted within and frictionally held by the smaller portion of the axial bore within the handle 10, said stem 12 being of a length greater than that of said handle and adapted to extend somewhat at one end within the larger portion of said bore and project at the other end beyond the tip end of said handle, as is clearly shown in Figure 2. A pair of nuts 13, of a size to be received in the larger portion of the bore in the handle 10, are mounted in threaded engagement on and with the end of the stem 12 within said handle, one of said nuts 13 serving to limit axial movement of said stem in one direction through engagement of said nut with the shoulder formed by the difference in diameter of the two portions of the bore within said handle, the other of said nuts 13 serving as clamping means to hold the end of an electrical conductor 14 in operative connection with said stem. The end of the conductor 14 may be twisted about the end of the stem 12 and clamped between the nuts 13, in a common manner, or, as shown, a connector 15 may be permanently secured to the end of said conductor and provided with an apertured portion adapted for clamping between said nuts, as is likewise common practice. A substantially cylindrical sleeve 16 is formed of material having a relatively high coefficient of electrical conductivity and with a two-diameter, axial bore, the smaller portion of said bore being internally threaded for engagement with the threads on the projecting end of the stem 12 whereby said sleeve is mounted on said stem as an axial extension thereof, the larger portion of the bore within said sleeve opening away from said stem. A working tip 17, of a material to which solder does not adhere and which may be readily heated by the passage of electric current therethrough, such as carbon, is formed with a cylindrical shank of a size to fit snugly within and be frictionally held by the larger portion of the bore in the sleeve 16 and extends axially from said sleeve to terminate in a shaped point. As shown in the drawings, various tips 17 may be provided, of differing sizes and shapes and mounted in suitable sleeves 16, which may be substituted for the tip 17 and sleeve 16 shown on the tool according to the character of the work on which the tool is employed.

As shown in Figure 5, when the tool is to be employed on material, indicated by the numeral 18, not forming part of an electric circuit, the unsecured end of the conductor 14 is operatively connected with one pole of a source of electric current, such as a battery 19, the other pole of said source of current being connected by means of a conductor 20 with the material 18. When the connections have been established as shown in Figure 5 and contact is made between the tip 17 of the tool and material 18, an electric circuit is established and current is permitted to flow from the battery 19 through the conductors 14 and 20, stem 12, sleeve 16 and tip 17, heating said tip which is then ready to be used in melting and spreading solder on the material 18, raising of said tip from said material interrupts the circuit and permits cooling of said tip and provides facile means for controlling the temperature of said tip.

When the tool is to be used on an automobile or other apparatus having electrical equipment and a grounded circuit, the conductor 14 is connected with any one of the "live" wires of said circuit and is then ready for use on any of the material of the apparatus included in the "ground" of the circuit, there being then no need for the circuit closing conductor 20.

Since an electric current of high voltage would cause the tip 17 to arc and incandesce, it is obvious that the tool above described is limited to use with low voltage currents, such as are usually supplied by storage batteries and the like, but since it may be expedient to employ a lighting circuit or power line in the operation of the tool, means may be provided for reducing the voltage of the commercial circuits before the tool is brought into said circuits, one such means being shown in Figure 6 as comprising a transformer or voltage reducer 21, of common type, connected for current intake with a high voltage line 22 and for current output with the conductors 14 and 20 of the system above described, the unit 21 being adjusted to deliver a current of suitable voltage.

Through the use of the tool and system above set forth, many advantages may be had over the tinned-iron method of soldering. In the first place, through the removable and replaceable feature of the sleeve 16 and tip 17, the tool may be readily adapted to the work in hand through selection of the proper tip for such work. Further, the greatest heat in the tip 17 is had when said tip is in contact with the work and at the time such heat is most needed and the material worked on may be heated by the tip 17 to facilitate spreading and adherence of the solder without cooling of said tip. In addition, the tip 17 needs no cleaning or tinning and a smoother spread of solder may be had because of the fact the solder will not adhere to said tip. The tool is partcularly adapted to working in small spaces where a small tool of the preheated type would too rapidly lose its heat, and is a material convenience in working on automobiles and electrical equipment where the conductor 14 may be quickly connected with the existing equipment and the tool employed without further wiring or connection on any of the material included in the ground circuit of such equipment.

Since the drawings and foregoing description are specific to but one form of the invention, and since said invention may be modified in structure and form without departing from the principle and spirit thereof, I wish to be understood as being limited solely by the scope of the appended claims.

I claim as my invention—

1. Electric soldering means comprising an interrupted low voltage circuit, material to be soldered connected with and forming a part of one side of said circuit, a manually-operable tool connected with and forming a part of the other side of said circuit, said tool comprising an electrically-insulated handle, a metallic stem axially within and slidable longitudinally of said handle, electrical connections between one side of said circuit and said stem within said handle, a hollow sleeve axially alined with and removably and replaceably carried by said stem without said handle and a tip of material heatable by the passage of electric current therethrough and to which solder will not adhere frictionally held within and extending axially from said sleeve, said tool being operable to close said circuit and heat said tip through contact of said tip with said material to be soldered.

2. In electric soldering means having an interrupted low voltage circuit and material to be soldered connected with and forming a part of one side of said circuit, an electrically-heatable, manually-operable tool connected with and forming a part of the other side of said circuit and operable to close said circuit through contact of said tool with said material to be soldered, said tool comprising an electrically-insulated handle, a metallic stem axially within and slidable longitudinally of said handle, electrical connections between one side of said circuit and said stem within said handle, a hollow sleeve axially alined with and removably and replaceably carried by said stem without said handle and a tip of material heatable by the passage of electric current therethrough and to which solder will not adhere frictionally held within and extending axially from said sleeve.

3. In electric soldering means having an interrupted low voltage circuit and material to be soldered connected with and forming a part of one side of said circuit, an electrically-heatable, manually-operable tool connected with and forming a part of the other side of said circuit, said tool being operable to close said circuit through contact with said material to be soldered and comprising an electrically-insulated handle, a two-diameter bore axially of said handle, a metallic stem within, slidable relative to and frictionally positioned by the smaller portion of said bore, one end of said stem extending within the larger portion of said bore for connection therein with a conductor forming one side of said circuit and the other end of said stem projecting beyond said handle, a hollow sleeve in threaded engagement with and extending axially from the projecting end of said stem and a tip of material heatable by the passage of electric current therethrough and to which solder will not adhere frictionally held within and extending axially from said sleeve.

Signed at Denver, in the county of Denver and State of Colorado, this 12th day of April, 1929.

WALTER SCHMIDT.